US008095641B2

(12) United States Patent
Aggarwal et al.

(10) Patent No.: US 8,095,641 B2
(45) Date of Patent: Jan. 10, 2012

(54) METHOD AND SYSTEM FOR VIRTUALIZED HEALTH MONITORING OF RESOURCES

(75) Inventors: Vijay K. Aggarwal, Austin, TX (US); Chakkalamattam J. Paul, Austin, TX (US); Puthukode G. Ramachandran, Austin, TX (US); Andrew N. Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 11/260,574

(22) Filed: Oct. 27, 2005

(65) Prior Publication Data

US 2007/0100987 A1    May 3, 2007

(51) Int. Cl.
*G06F 15/173* (2006.01)
(52) U.S. Cl. .................. 709/224; 709/223; 709/226
(58) Field of Classification Search .................. 709/223, 709/224, 226, 203; 340/3.1–3.9; 370/250, 370/252; 702/32, 108, 119, 123, 127
See application file for complete search history.

(56) References Cited

U.S. PATENT DOCUMENTS

| 6,138,013 A | 10/2000 | Blanchard et al. | |
| 2005/0132041 A1 * | 6/2005 | Kundu | 709/224 |
| 2006/0112188 A1 * | 5/2006 | Albanese et al. | 709/238 |

FOREIGN PATENT DOCUMENTS

| EP | 0994419 | 4/2000 |
| WO | 2004001555 A | 12/2003 |

OTHER PUBLICATIONS

Baker et al., "GridRM: An extensible Resource Monitoring System", Dec. 1, 2003 retrieved from http://ieeexplore.ieee.org/stamp/stamp.jsp?arnumber=01253317 on Nov. 24, 2008.*
Baker et al., "Ubiquitous Grid Resource Monitoring", Sep. 1, 2004, retrieved from http://www.nesc.ac.uk/bibliography/paperdetails.cfm?id=1270 on Oct. 15, 2009.*
Cooke et al., "R-GMA: An Information Integration System for Grid Monitoring", Oct. 22, 2003, retrieved from http://www.springerlink.com/content/e9c1whv4lq8pk719/ on Feb. 26, 2010.*

* cited by examiner

*Primary Examiner* — Joon H Hwang
*Assistant Examiner* — Thomas Lee, IV
(74) *Attorney, Agent, or Firm* — Yee & Associates, P.C.; Jeffrey S. LaBaw (57) ABSTRACT

A method and system for monitoring computational resources within a data processing system is presented. A monitoring service receives a non-application-specific request to perform a monitoring operation in order to gather information about the usage of a computational resource within a data processing system. The monitoring service automatically selects a monitoring application from a set of monitoring applications in which the selected monitoring application is able to perform the monitoring operation on the computational resource. The monitoring service then sends to the selected monitoring application an application-specific request that identifies the computational resource and indicates the monitoring operation to be performed on the computational resource.

20 Claims, 7 Drawing Sheets

METHOD AND SYSTEM FOR VIRTUALIZED HEALTH MONITORING OF RESOURCES

BACKGROUND OF THE INVENTION

1. Field of the Invention

The present invention relates to an improved data processing system and, in particular, to a method and apparatus for multicomputer system management.

2. Description of Related Art

Many enterprises view their computer systems as data centers. A data center consists of a variety of hardware resources and software resources. For example, hardware resources may include switches, load balancers, servers, and power units, whereas software resources may include database applications and e-commerce transaction applications.

Proper computer system management requires information about computer components and network components, the state of each of those items, and their relationships. In order to maintain the smooth functioning of a data center, the health of resources within the data center are checked using monitoring applications, which gather information about the state of a data center over a period of time. This information may include monitoring of networks, network paths, computers, operating systems, file systems, installed applications, software application components, user transactions, statistics of usage, and other information.

Many monitoring applications are commercially available which provide the ability to monitor a certain type of resource. While these software products have the same general purpose of resource monitoring, they differ in internal implementations and programmatic interfaces. For example, some monitoring tools are able to perform remote monitoring by communicating with a remotely deployed application using an appropriate, standardized, communication protocol, while other monitoring tools require the remote deployment of agents. Some monitoring applications provide further specialization by providing an independent monitoring component or resource model for each resource type. In order to use this variety of monitoring tools, a system administrator needs to be aware of many nuances that are associated with the usage of particular products in order to activate an appropriate monitoring behavior. For example, an administrative user needs to know: the availability of monitoring products from which the administrative user may select for performing certain operations; the manner in which the monitoring products deploy monitors or otherwise perform those operations; the types of security credentials that may be needed in order to deploy monitoring resources; and many other variables. In addition to knowing the details of the different monitoring products, a data center administrator also needs to understand the detailed configuration of the resources in the data center in order to deploy the appropriate monitoring components. Thus, the variability across these monitoring products represents a complex challenge for a data center administrator.

Therefore, it would be advantageous to have a system and a method that has the ability to manage multiple monitoring products in order to manage a data center more effectively.

SUMMARY OF THE INVENTION

A method and system for monitoring computational resources within a data processing system is presented. A monitoring service receives a non-application-specific request to perform a monitoring operation in order to gather information about the usage of a computational resource within a data processing system. The monitoring service automatically selects a monitoring application from a set of monitoring applications in which the selected monitoring application are able to perform the monitoring operation on the computational resource. The monitoring service then sends to the selected monitoring application an application-specific request that identifies the computational resource and indicates the monitoring operation to be performed on the computational resource.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
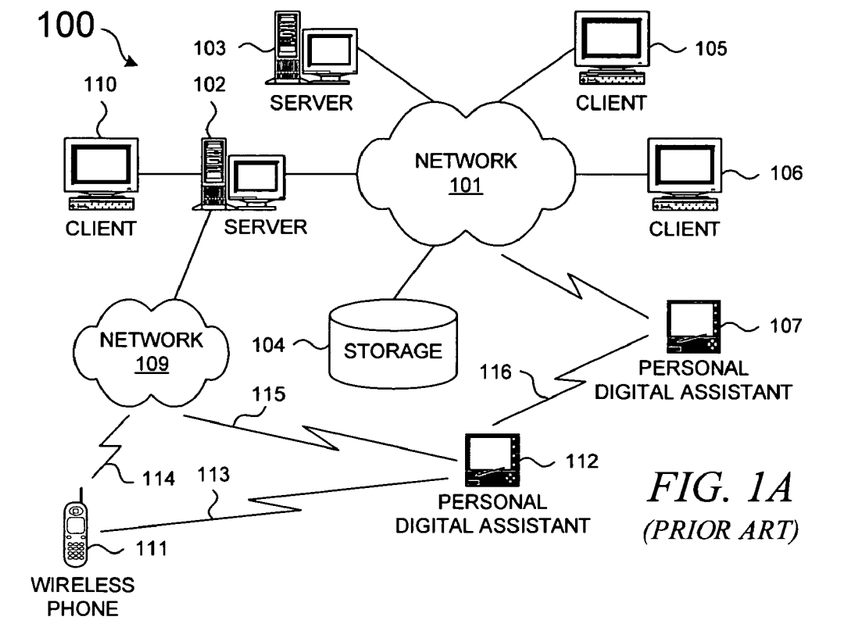
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports network 109 and client 110; network 109 incorporates wireless communication links. Network-enabled phone 111 and PDA 112 can directly transfer data between themselves across wireless link 113 using an appropriate technology, e.g., via Bluetooth™ wireless technology or Wi-Fi technology (IEEE 802.11) that allows the creation of so-called personal area networks (PAN) or personal ad-hoc networks. Phone 111 connects to network 109 through wireless link 114, and PDA 112 connects to network 109 through wireless link 115. In a similar manner, PDA 112 can transfer data to PDA 107 via wireless link 116.

The present invention could be implemented on a variety of hardware platforms; FIG. 1A is intended as an example of a heterogeneous computing environment and not as an architectural limitation for the present invention.

Figure 1B:
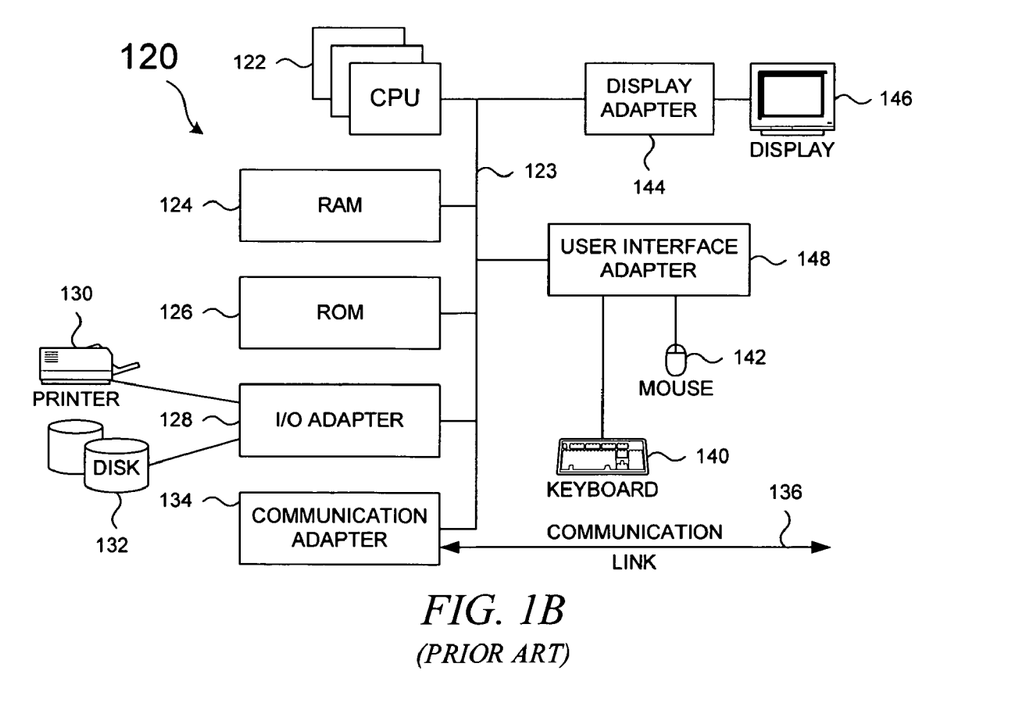
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

It should be appreciated that the hardware in FIG. 1B may vary in different systems. For example, a system may have different processors, such as an Intel® Pentium®-based processor and a digital signal processor (DSP), and different types of memory. Other peripheral devices may be used in addition to or in place of the depicted hardware, which is not meant to imply limitations with respect to the present invention. In addition to being able to be implemented on a variety of hardware platforms, the present invention may be implemented in a variety of software environments. For example, one device may run a Unix® operating system while another device supports a Java® runtime environment.

Figure 2:
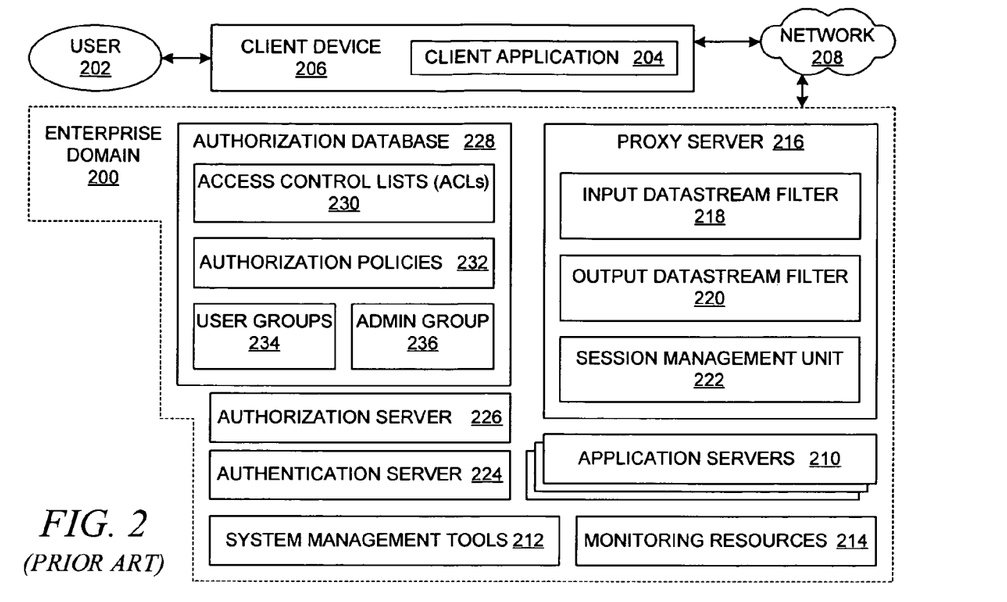
FIG. 2 depicts a block diagram that shows a typical enterprise data processing system.

With reference now to FIG. 2, a block diagram depicts a typical enterprise data processing system. Whereas FIG. 1A depicts a typical data processing system with clients and servers, in contrast, FIG. 2 shows a client within a network in relation to some of the server-side entities that may be used to support client requests to access resources. As in a typical computing environment, enterprise domain 200 hosts resources that user 202 can access, e.g., by using client application 204 on client device 206 through network 208; the computer network may be the Internet, an intranet, or other network, as shown in FIG. 1A.

Enterprise domain 200 is a data center that supports multiple servers. Application servers 210 support access to controlled resources and/or uncontrolled resources, including web-based applications or other types of back-end applications, including legacy applications. Enterprise domain 200 also contains system management tools 212 and monitoring resources 214. System management tools 212 provides various applications, utilities, or other resources that may be employed by a data center/system administrator to effect management of enterprise domain 200. Monitoring resources 214 include those types of resources that are employed to monitor other resources and gather information while monitoring those resources such that the gathered information may be used by system management tools 212 to effect management of enterprise domain 200. Monitoring resources 214 may include legacy monitoring applications, commercially available monitoring applications, third-party applications, and other types of monitoring components.

Reverse proxy server 216, or more simply, proxy server 216, performs a wide range of functions for enterprise domain 200. For example, proxy server 216 may cache web pages in order to mirror the content from an application server. Incoming and outgoing datastreams may be processed by input datastream filter 218 and output datastream filter 220, respectively, in order to perform various processing tasks on incoming requests and outgoing responses in accordance with goals and conditions that are specified within various policies or in accordance with a configuration of deployed software modules. Session management unit 222 manages session identifiers, cached credentials, or other information with respect to sessions as recognized by proxy server 216.

The above-noted entities within enterprise domain 200 represent typical entities within many computing environments. However, many enterprise domains have security features for controlling access to protected computational resources. Authentication server 224 may support various authentication mechanisms, such as username/password, X.509 certificates, or secure tokens; multiple authentication servers could be dedicated to specialized authentication methods. Authorization server 226 may employ authorization database 228, which contains information such as access control lists 230, authorization policies 232, information about user groups or roles 234, and information about administrative users within a special administrative group 236. Using this information, authorization server 226 provides indications to proxy server 216 whether a specific request should be allowed to proceed, e.g., whether access to a controlled resource should be granted in response to a request from client 206. It should be noted that the present invention may be implemented in association with a variety of authentication and authorization applications, and the embodiments of the present invention that are depicted herein should not be interpreted as limiting the scope of the present invention with respect to a configuration of authentication and authorization services.

As depicted in the previously described figures, a typical computational environment may include servers that support client applications that request access from the servers to computational resources. A computational resource may be an electronic data processing device/subsystem/system, an application, an object, an executable code module, a document, a web page, a file, a database, a database record, various other types of functional units, various other types of information units, or various types of communication functions. A protected or controlled resource is a resource that is only accessible or retrievable if the requesting client or requesting user is authenticated and/or authorized; in some cases, an authenticated user is, by default, an authorized user.

More specifically, though, the present invention is directed to improved system management via monitoring of resources within data processing environments. In view of the above-described background information, embodiments of the present invention are explained in more detail hereinbelow with respect to the remaining figures.

Figure 3:
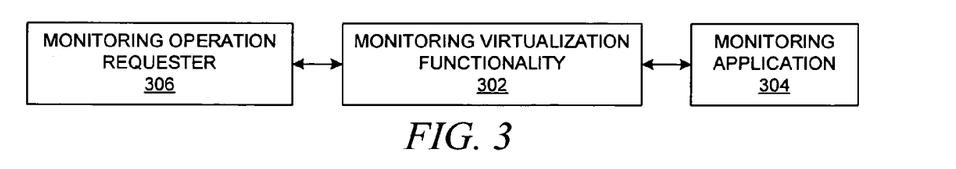
FIG. 3 depicts a block diagram that shows the virtualization functionality of the present invention with respect to monitoring operations.

With reference now to FIG. 3, a block diagram depicts the virtualization functionality of the present invention with respect to monitoring operations. As noted above, the management of a computer system often requires dynamic information about computer system resources that may be obtained only by monitoring the operations of those computer system resources, and many monitoring applications are commercially available which provide the ability to monitor certain types of resources.

Rather than require system administrators to know the complexities of the abilities and requirements of multiple monitoring applications, the present invention virtualizes monitoring applications by providing a virtualization layer of abstract logical monitoring operations and device models to represent monitoring applications. Monitoring virtualization functionality 302 of the present invention hides implementation details of monitoring application 304 from monitoring operation requester 306 such that monitoring operation requester 306 need not be aware of the operational differences between multiple monitoring applications. The present invention allows a new monitoring application to be introduced into a data center environment by defining logical monitoring operations that facilitate the completion of the implemented monitoring operations of the new monitoring application. In this manner, the details of a monitoring application and its deployment characteristics are not exposed to the computational entities that use the monitoring application. The virtualization layer of the present invention helps to reduce the complexity of managing multiple monitoring applications.

The management of a data center may be performed in a variety of ways, any of which may include the usage of one or more system management applications or administrative utility tools through which an administrative user observes and controls the computational environment of the data center. In a preferred embodiment, the present invention is implemented as a monitoring service that accepts a request to monitor one or more computational resources and ensures that the appropriate monitoring operations are performed in response to the request; in so doing, a monitoring service may interact with or respond to one or more system management applications or administrative utility tools within a data center that requests monitoring operations from the monitoring service. The form factor of a monitoring service may vary across different implementations of the present invention. For example, a monitoring service may be implemented as a stand-alone application, or a monitoring service may be embedded within a service infrastructure that responds to a variety of service requests; alternatively, a monitoring service may be implemented as one or more software modules or various types of software components that may be incorporated within other software applications, such as a system management application or an administrative utility tool.

Figure 4:
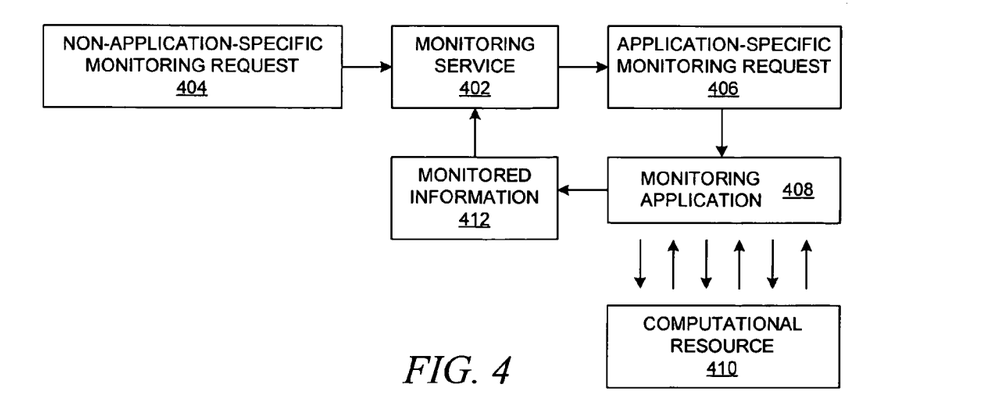
FIG. 4 depicts a block diagram that shows some of the data flow with respect to a monitoring service.

With reference now to FIG. 4, a block diagram depicts some of the data flow with respect to a monitoring service that is implemented in accordance with an embodiment of the present invention. At some point in time during management of a data center, monitoring service 402 receives non-application-specific monitoring request 404 from a requesting entity, which might include a system management application or an administrative utility tool. Given that the monitoring service of the present invention implements logical or generic monitoring operations on behalf of requesters, a requesting entity may send to the monitoring service a request for a monitoring operation that is not specific with respect to a particular monitoring application. In other words, a requester may send to the monitoring service a request for a monitoring operation that is generic with respect to a particular monitoring application, i.e. an application-generic monitoring request, which is shown in FIG. 4 as non-application-specific monitoring request 404. In this manner, the requester indicates a type of generic or logical monitoring operation, and the monitoring service ensures that the generic monitoring operation is fulfilled by the performance of an appropriate monitoring operation at a specific monitoring application. As shown in FIG. 4, the monitoring service generates application-specific monitoring request 406 in response to receiving non-application-specific monitoring request 404. Application-specific monitoring request 406 and non-application-specific monitoring request 404 may differ in many ways. For example, non-application-specific monitoring request 404 may not contain sufficient information that would allow a specific monitoring application to perform the requested monitoring operation. Alternatively, non-application-specific monitoring request 404 may not be formatted properly in a manner that allows a monitoring application to interpret the request.

Application-specific monitoring request 406 is sent by the monitoring service to an appropriate monitoring application 408. In response, monitoring application 408 monitors computational resource 410 and gathers monitored information 412, which is returned to monitoring service 402. Monitoring application 408 does not necessarily communicate directly with computational resource 410 and may make observations of the operational characteristics of computational resource 410 indirectly, e.g., by monitoring network traffic to and/or from computational resource 410.

Figure 5:
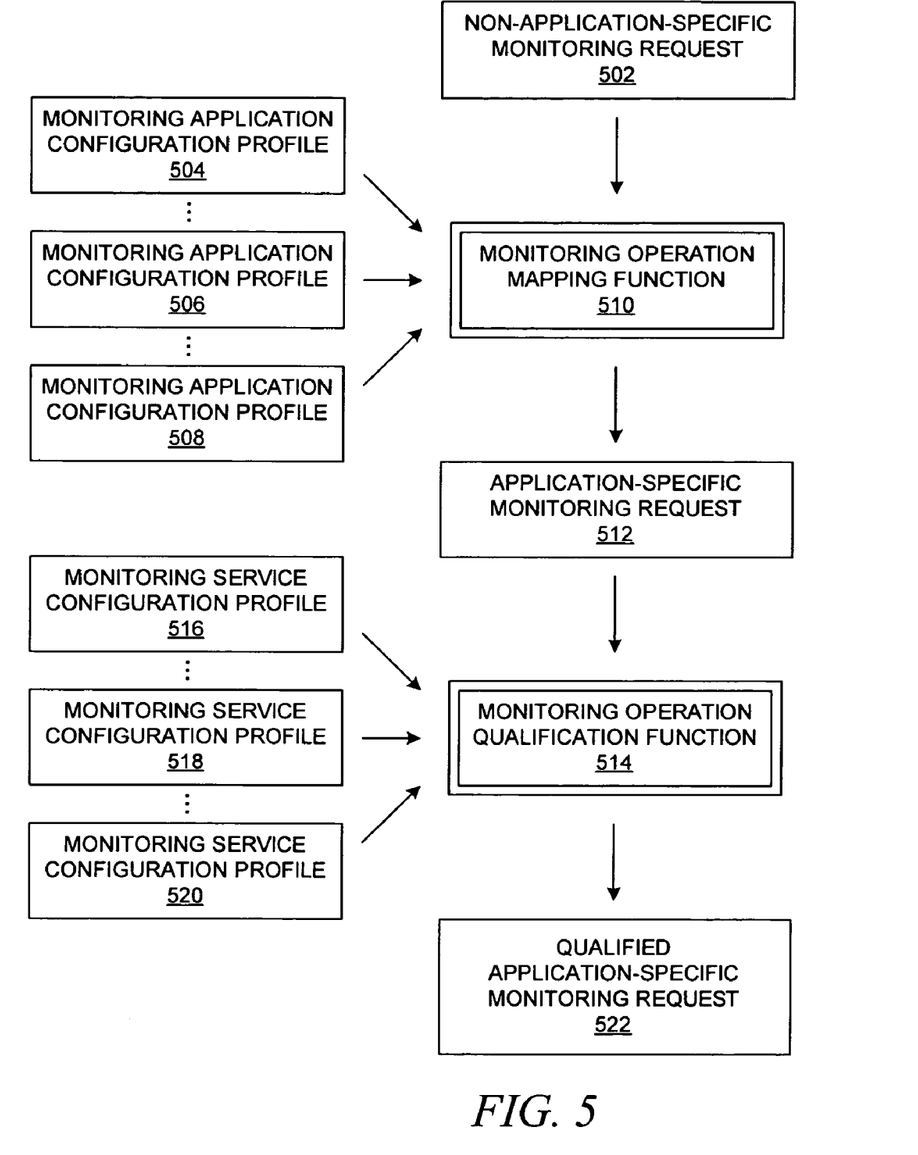
FIG. 5 depicts a block diagram that shows an overview of some data flow that is managed by a monitoring service in order to generate application-specific monitoring operation requests in response to receipt of non-application-specific monitoring operation requests.

With reference now to FIG. 5, a block diagram depicts an overview of some data flow that is managed by a monitoring service in order to generate application-specific monitoring operation requests in response to receipt of non-application-specific monitoring operation requests in accordance with an embodiment of the present invention. A monitoring service receives non-application-specific monitoring request 502, which indicates a generic or non-application-specific monitoring operation that is being requested to be performed on behalf of the requester, such as a system management application. The monitoring service obtains multiple monitoring application configuration profiles 504-508 and analyzes these profiles; each profile contains information about the capabilities of a particular monitoring application to perform certain types of monitoring operations with respect to certain types of computational resources. Given that a particular monitoring application profile is uniquely associated with a particular monitoring application, the monitoring service selects a monitoring application to perform the requested generic monitoring operation based on its selection of a monitoring application configuration profile; the monitoring application configuration profile is selected based on its information that indicates that its associated monitoring application is able to perform the requested monitoring operation.

The functionality within the monitoring service for selecting a monitoring application is represented within FIG. 5 by monitoring operation mapping function 510, which reflects that the monitoring service maps the requested non-application-specific monitoring operation to an application-specific implementation, i.e. an application-specific monitoring operation, that is able to perform the requested generic monitoring operation in a sufficient manner. The manner in which monitoring operation mapping function 510 maps the non-application-specific monitoring operation may be performed in a variety of ways. For example, monitoring operation mapping function 510 may employ algorithms that weigh characteristics of the various monitoring applications, or monitoring operation mapping function 510 may be guided by configurable policies that provide rules for selecting the seemingly best characteristics amongst appropriate monitoring applications.

The computational resources that are supported within a data processing system may be classified or categorized according to resource type, and the various resource types are uniquely assigned numerical indication values that represent a resource type. The types of resources that are supported by a monitoring application, i.e. the resource types on which a monitoring application is able to perform various monitoring operations, is indicated within a monitoring application configuration profile by storing the appropriate numerical indication values for the resource types that the monitoring application supports; these numerical values provide one input parameter for monitoring operation mapping function 510. These indicating values for various resource types can be compared and matched against an indicating value of a resource type of the computational resource on which the non-application-specific monitoring operation is being requested. In this manner, the monitoring service can determine from a particular monitoring application profile whether or not a monitoring application can support the necessary resource type for the received non-application-specific monitoring request 502.

In a similar manner, different types of application-specific monitoring operations may have required input parameters, and the different types of input requirements of the application-specific monitoring operations, and therefore also the monitoring applications, can be classified or categorized and assigned to numerical indication values. The monitoring service may perform a comparison of the types of input requirements of a monitoring application with the input parameters that are given within received non-application-specific monitoring request 502; only monitoring applications that support the requirements of the received request are eligible for selection by monitoring operation mapping function 510.

Likewise, different types of application-specific monitoring operations produce or output certain types of metric data as a result of performing a monitoring operation, and the different types of outputted metric data of the application-specific monitoring operations, and therefore also the monitoring applications, can be classified or categorized and assigned to numerical indication values. The monitoring service may perform a comparison of the types of outputted metric data of a monitoring application with the input parameters that are given within received non-application-specific monitoring request 502; only monitoring applications that support the requirements of the received request are eligible for selection by monitoring operation mapping function 510.

In addition, different types of application-specific monitoring operations may have specific bandwidth requirements while performing a monitoring operation, and the different types of bandwidth requirements of the application-specific monitoring operations, and therefore also the monitoring applications, can be classified or categorized and assigned to numerical indication values. The monitoring service may perform a comparison of the types of bandwidth requirements of a monitoring application with the input parameters that are given within received non-application-specific monitoring request 502; only monitoring applications that support the requirements of the received request are eligible for selection by monitoring operation mapping function 510. In this manner, the originating requester of non-application-specific monitoring request 502 can specify how much bandwidth usage that it is willing or able to tolerate to perform the requested monitoring operation.

Other types of computational costs may be specified by the originating requester of non-application-specific monitoring request 502, thereby allowing the originating requestor to control the computational costs of performing a monitoring operation without having direct knowledge of the computational costs of the various monitoring applications. The monitoring service provides the functionality for selecting amongst multiple monitoring applications after the monitoring service determines whether the requirements and capabilities of a monitoring application are adequate or sufficient, as indicated within the monitoring applications' monitoring application configuration profiles 504-508 and then examined by the monitoring service.

After a monitoring application has been selected, the monitoring service may generate application-specific monitoring request 512, which may contain sufficient information to initiate a monitoring operation at the selected monitoring application, e.g., an indication of the application-specific monitoring operation that should be performed by the selected monitoring application and an identifier that indicates a target computational resource that the selected monitoring application should monitor; other application-specific information may be included in application-specific monitoring request 512 as appropriate.

Before sending application-specific monitoring request 512 to a monitoring application, however, the monitoring service may modify application-specific monitoring request 512 to include additional operational parametric information such that the requested monitoring operation is performed in accordance with the operational parametric information. These operational parametric information may include numerical values for various variables to control the manner in which the requested monitoring operation executes while performing the requested monitoring operation. For example, the operational parametric information may include temporal restrictions on the monitoring operation such that the monitoring operation is performed in accordance with a predetermined schedule; other types of operational restrictions or qualifications may be included, such as a repetition count for indicating the number of times or cycles that a monitoring operation should be performed.

Hence, the monitoring service may also include functionality for automating the selection of optional parameters for monitoring operations, as represented in FIG. 5 by monitoring operation qualification function 514. The monitoring service obtains multiple monitoring service configuration profiles 516-520 and analyzes these profiles; each profile contains optional parametric information to be used when performing certain types of monitoring operations with respect to certain types of computational resources. These optional operational parameters are communicated via qualified application-specific monitoring request 522 to the selected monitoring application.

Figure 6:
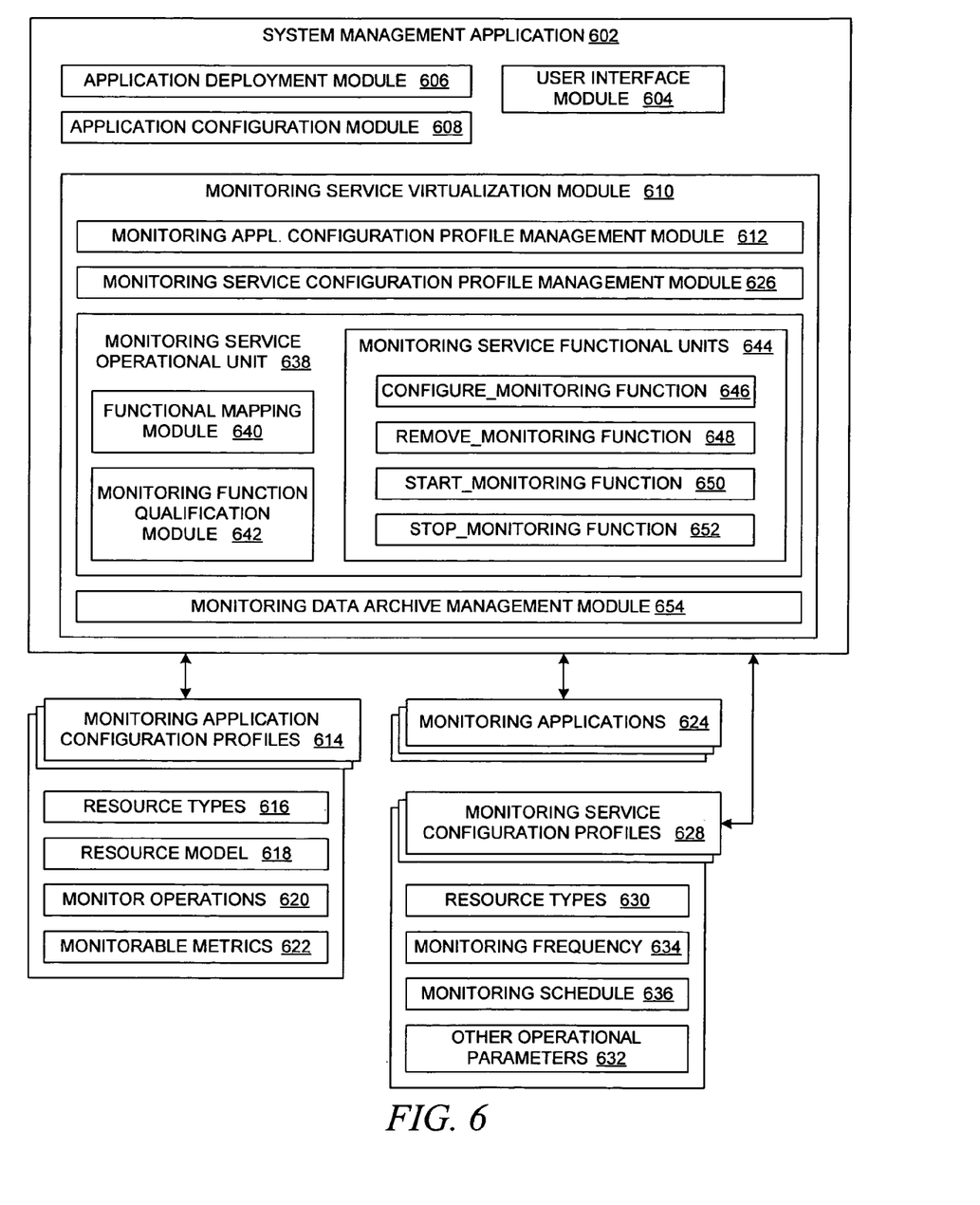
FIG. 6 depicts a block diagram that shows a configuration of components for implementing a monitoring service in coordination with a system management application in accordance with an embodiment of the present invention.

With reference now to FIG. 6, a block diagram depicts a configuration of components for implementing a monitoring service in coordination with a system management application in accordance with an embodiment of the present invention. System management application 602 contains user interface module 604 for providing graphical user interface capabilities for allowing an administrative user to control system management application 602. In a typical fashion for a system management application that is employed within a data center environment, system management application 602 also contains application deployment module 606 for managing deployment operations for applications within the data center environment and application configuration module 608 for managing configuration operations on the deployed applications. With the novel capabilities of the present invention, system management application 602 also contains monitoring service virtualization module 610 for implementing a monitoring service that is embedded within system management application 602 in accordance with an embodiment of the present invention.

Within service virtualization module 610, monitoring application configuration profile management module 612 facilitates management of monitoring application configuration profiles 614, which are similar to monitoring application configuration profiles 504-508 that are shown in FIG. 5. Each monitoring application configuration profile may be stored in an appropriate manner, such as a data file, a database record, or some other type of data structure; information within each monitoring application configuration profile may be arranged as a set of key-value pairs or in some other manner. Each of monitoring application configuration profiles 614 contain one or more resource types 616 that indicate the type or types of computational resources for which a monitoring application has the functionality to monitor; resource model 618 may be included to provide more complex information about the type or types of monitorable resources. Monitor operations 620 provides information, e.g., identifiers, for the monitor operations within the monitoring application, while monitorable metrics 622 provides information about the types of metric data that a monitoring application, e.g., one of monitoring applications 624, can return as a result of performing a monitoring operation.

Within service virtualization module 610, monitoring service configuration profile management module 626 facilitates management of monitoring service configuration profiles 628, which are similar to monitoring service configuration profiles 516-520 that are shown in FIG. 5. Each monitoring service configuration profile may be stored in an appropriate manner, such as a data file, a database record, or some other type of data structure; information within each monitoring service configuration profile may be arranged as a set of key-value pairs or in some other manner. Each of monitoring service configuration profiles 628 contain one or more resource types 630 that indicate the type or types of computational resources for which the containing monitoring service configuration profile is applicable. Each of monitoring service configuration profiles 628 may contain one or more operational parametric data items 632 that provide qualifications or restrictions on the manner in which a monitoring operation should be performed. In the example that is shown in FIG. 6, one of the operational parameters may be represented by monitoring frequency parameter 634, which indicates how often a monitoring operation should be cyclically repeated; another of the operational parameters may be represented by monitoring schedule parameter 636, which indicates a schedule for repeating a monitoring operation.

Monitoring service operational unit 638 accepts received requests for non-application-specific or generic monitoring operations and generates requests for application-specific monitoring operations that are sent to monitoring applications. In a manner similar to monitoring operation mapping function 510 that is shown in FIG. 5, functional mapping module 640 maps a defined non-application-specific monitoring operation to an implemented application-specific monitoring operation in accordance within information in monitoring application configuration profiles 614. In other words, functional mapping module 640 determines whether an application-specific monitoring operation is appropriate to fulfill the requirements of the non-application-specific monitoring operation. In a manner similar to monitoring operation qualification function 514 that is shown in FIG. 5, monitoring operation qualification module 642 qualifies a request for an application-specific monitoring operation by including operational parameters for the monitoring operation at the monitoring application in accordance within information in monitoring service configuration profiles 628.

Additional functional support for handling generic monitoring operations may be included within monitoring service functional units 644. In the example that is shown in FIG. 6, four non-application-specific monitoring operations are defined: configure_monitoring function 646; remove_monitoring function 648; start_monitoring function 650; and stop_monitoring function 652, although depending on the implementation of the present invention, additional or fewer functional units may be employed. Monitoring service functional units 644 may be responsible for generating, receiving, and/or processing specific types of messages or data for specific types of monitoring operations. For example, a non-application-specific "StartMonitoring" operation may be defined by the monitoring service; when a request for a "StartMonitoring" monitoring operation is received by the monitoring service, the monitoring service attempts to initiate a monitoring operation at a selected monitoring application with respect to an identified computational resource. However, each type of monitoring application may have a particular protocol that is required by the monitoring application to be followed before a monitoring operation is initiated, and the responsibility for ensuring that the requirements for initiating a monitoring operation at a monitoring application are accomplished would be performed by start_monitoring function 650.

Monitoring data archive management module 654 is responsible for processing monitored information that is received by the monitoring service from a monitoring application that has performed a monitoring operation. The received information may be stored or archived for real-time analysis or post-processing analysis by system management application 602 or some other administrative utility application; alternatively, the received information may be cached and/or forwarded to an application that initiated the original request for the non-application-specific monitoring operation.

Figure 7:
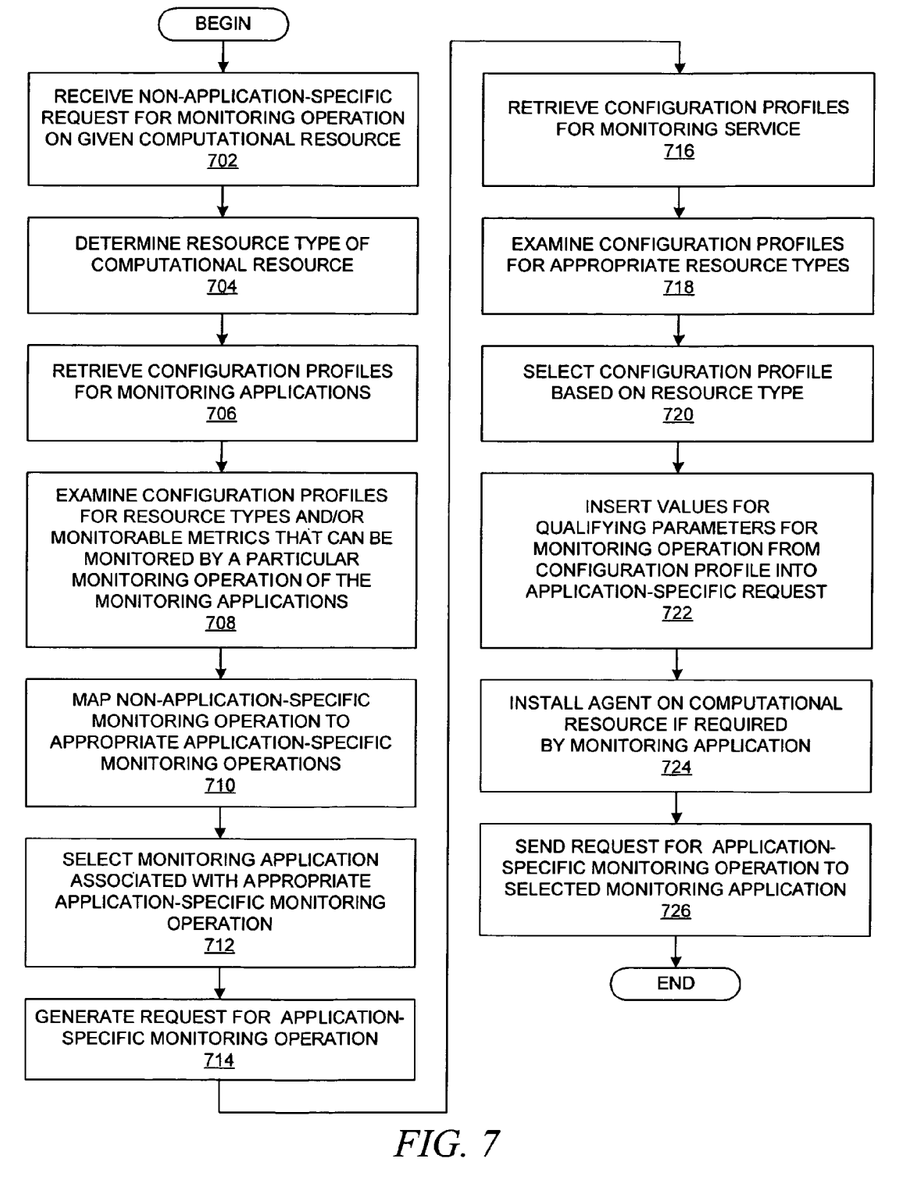
FIG. 7 depicts a flowchart that shows a process within a monitoring service for receiving a request for a non-application-specific monitoring operation and initiating an application-specific monitoring operation at a selected monitoring application in accordance with an embodiment of the present invention.

With reference now to FIG. 7, a flowchart depicts a process within a monitoring service for receiving a request for a non-application-specific monitoring operation and initiating an application-specific monitoring operation at a selected monitoring application in accordance with an embodiment of the present invention. The process commences when a monitoring service receives a non-application-specific request for a monitoring operation on a given computational resource (step 702), and the monitoring service determines the resource type of the given computational resource (step 704). A set of monitoring application configuration profiles are retrieved (step 706), each of which are uniquely associated with a monitoring application. Each configuration profile is examined for resource types and/or monitorable metrics that can be monitored by a particular monitoring operation of the monitoring application that is associated with the configuration profile (step 708); the requested non-application-specific monitoring operation is mapped to the application-specific monitoring operations of any monitoring application that satisfies the requirement of a matching resource types (and also optionally satisfies a requirement of a matching monitorable metric) (step 710).

An appropriate application-specific monitoring operation, and therefore, its associated monitoring application, is selected (step 712). Assuming that there are multiple application-specific monitoring operations that are available to perform the non-application-specific monitoring operation, the monitoring service can select amongst them, e.g., with reference to administrative policies or in accordance with an appropriate selection algorithm. A request for the application-specific monitoring operation is then generated (step 714), e.g., by generating a request message that contains any required information.

Prior to sending the request for the application-specific monitoring operation to the selected monitoring application, various optional operational parametric data values may be added to the request for the application-specific monitoring operation. A set of monitoring service configuration profiles are retrieved (step 716). Each configuration profile is examined for resource types and/or other matching characteristics that indicate that parameters within the configuration profile can be associated with the application-specific monitoring operation to qualify the manner in which the application-specific monitoring operation is performed by the selected monitoring application (step 718). A monitoring service configuration profile is selected (step 720) based on a matching resource type or some other criteria, which may be guided by an administrative policy, an appropriate selection algorithm, information within the received request for a non-application-specific monitoring operation, some other information, or some combination of these data items. Values for the qualifying parameters are then inserted into the previously generated request message for the application-specific monitoring operation (step 722).

In some cases, the monitoring service may perform one or more steps to prepare the computational resource to be monitored. In particular, the monitoring application may have some requirements with respect to the resource that is going to be monitored. For example, the monitoring application may need an agent to be executing at or on the resource that is going to be monitored, whereby the agent assists the monitoring application in the monitoring operation with respect to the monitored resource; in such cases, the monitoring service installs an agent on the resource (step 724) or performs some other action to prepare the resource to be monitored. The request for the application-specific monitoring operation is then sent to the selected monitoring application (step 726), and the process is concluded.

Figure 8:
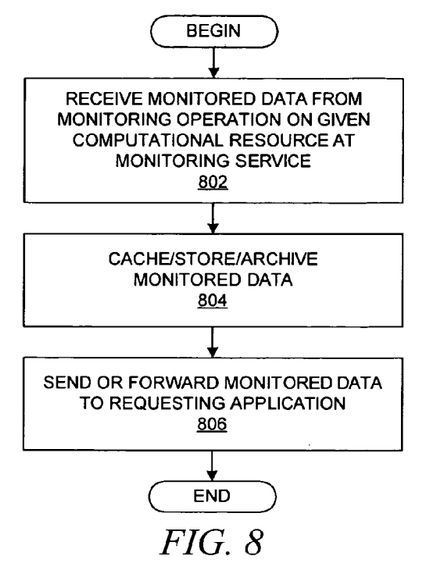
FIG. 8 depicts a flowchart that shows a process for handling data that has been received by a monitoring service as a result of an application-specific monitoring operation that was requested by the monitoring service at a monitoring application.

With reference now to FIG. 8, a flowchart depicts a process for handling data that has been received by a monitoring service as a result of an application-specific monitoring operation that was requested by the monitoring service at a monitoring application in accordance with an embodiment of the present invention. The process commences when a monitoring service receives monitored data from a monitoring application after performing an application-specific monitoring operation on a specified computational resource as requested by the monitoring service (step 802). The monitoring service may cache, store, or archive the monitored data (step 804) and/or forward the monitored data to an originally requesting application that sent a request for a non-application-specific monitoring operation to the monitoring service at a previous point in time (step 806), thereby concluding the process.

Figure 9:
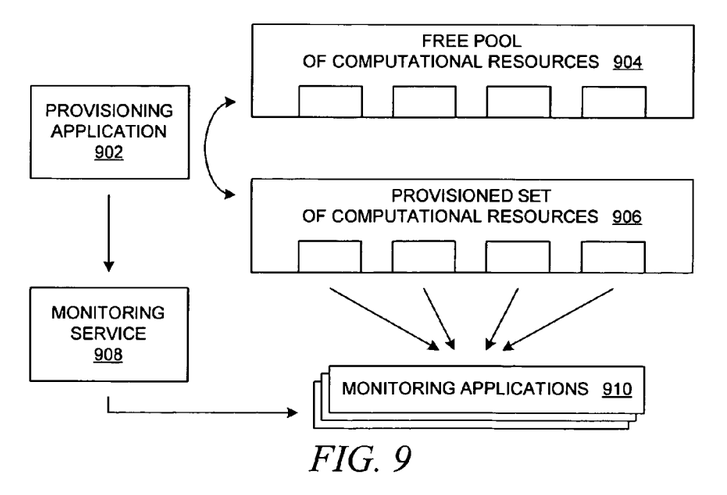
FIG. 9 depicts a block diagram that shows an interaction between a provisioning application and a monitoring service to accomplish automatic monitoring of provisioned resources.

With reference now to FIG. 9, a block diagram depicts an interaction between a provisioning application and a monitoring service to accomplish automatic monitoring of provisioned resources. Provisioning application 902 manages the allocation and deallocation, i.e. provisioning and deprovisioning, of computational resources. For example, provisioning application may be a component within an operating system, a load balancer, or some other component that is responsible for dynamic adjustment and/or availability of active resources as needed by other components within a data processing system.

As provisioning application 902 provisions a computational resource, thereby logically moving the computational resource from a free/unused/unprovisioned pool of computational resources 904 to the provisioned set of computational resources 906, provisioning application ensures that the newly provisioned computational resource is monitored by sending a non-application-specific monitoring request to monitoring service 908. Using the processes described hereinabove, monitoring service 908 requests one or more monitoring applications 910 to start monitoring the newly provisioned computational resource.

Figure 10:
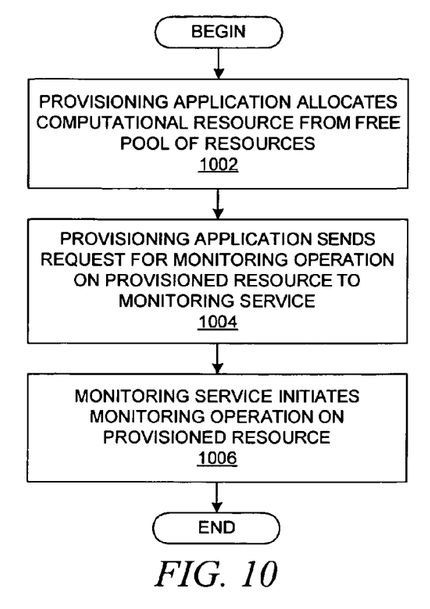
FIG. 10 depicts a flowchart that shows a process for automatically monitoring newly provisioned computation resources.

With reference now to FIG. 10, a flowchart depicts a process for automatically monitoring newly provisioned computation resources. The process commences when a provisioning application allocates or provisions a computational resource from a free pool of resources (step 1002). The provisioning application automatically sends a monitoring request to a monitoring service to monitor the newly provisioned resource (step 1004). In response to receiving the request, the monitoring service sends a request to a monitoring application to perform a monitoring operation on the newly provisioned resource (step 1006), thereby concluding the process.

A reverse or complementary process may also be performed. When the provisioning application deallocates or deprovisions a resource and changes its status from active to inactive or free, thereby logically moving the resource back to the free pool of resources, the provisioning application sends a request to the monitoring service to stop monitoring the computational resource that has been deprovisioned or freed. The monitoring service ensures that the monitoring operation is stopped by informing the appropriate monitoring application.

In this manner, the provisioning application can rely upon the monitoring service to initiate monitoring operations on various resources as those resources are activated for use. The monitoring service and its operations can be flexibly configured to handle the management of the monitoring operations within the data processing system, and the provisioning application remains compartmentalized with respect to monitoring operations.

FIG. 10 illustrates the actions of a monitoring service with respect to a provisioning application. However, the actions of the monitoring service with respect to a provisioning application may be generalized and categorized with other actions that are dynamically performed by a monitoring service. For example, a monitoring operation that is automatically initiated with respect to actions of a provisioning application can be handled in conjunction with other actions that the monitoring service performs automatically in the dynamic computational environment of a data center, as shown more specifically in FIG. 11.

Figure 11:
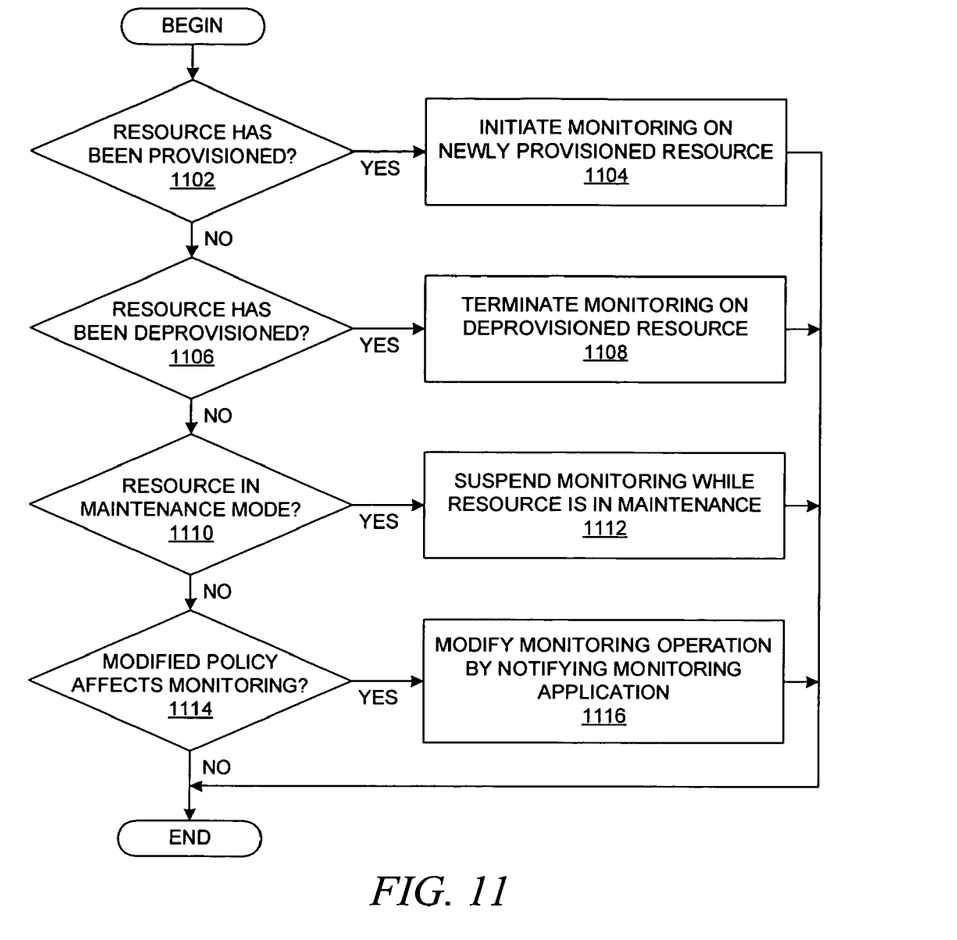
FIG. 11 depicts a flowchart that shows an event processing loop of a monitoring service for dynamically handling events that require the initiation or conclusion of a monitoring operation on a computational resource.

With reference now to FIG. 11, a flowchart depicts an event processing loop of a monitoring service for dynamically handling events that require the initiation or conclusion of a monitoring operation on a computational resource. The event processing loop of FIG. 11 may be performed in a variety of manners, e.g., using a dedicated thread that executes to dynamically check for occurrences of events in an event queue or for newly entered data within a data structure. Alternatively, the monitoring service may be called or signaled when such events occur, at which time the monitoring service could individually process an event.

The process commences with a determination of whether or not a computational resource has been provisioned (step 1102); for example, a provisioning application may dynamically provision computational resources as described above with respect to FIG. 9 and FIG. 10. If so, then the monitoring service initiates a monitoring operation on the resource through the appropriate monitoring application (step 1104); if not, then the monitoring service continues to check for other events.

A determination is made as to whether or not a monitored computational resource has been deallocated or deprovisioned and returned to a free pool of resources (step 1106). If so, then the monitoring service concludes or teminates the associated monitoring operation on the resource (step 1108), e.g., by notifying the monitoring application to terminate or to otherwise conclude the monitoring operation; if not, then the monitoring service continues to check for other events.

A determination is made as to whether or not a computational a resource is being placed into a maintenance mode (step 1110). If so, then the monitoring service suspends monitoring on the resource (step 1112) while the resource is in maintenance mode if the monitoring operation and the time period for the maintenance mode allows for temporary suspension; alternatively, the monitoring operation may be terminated.

A determination is made as to whether or not a policy that directs or characterizes a monitoring operation has changed such that the change to the policy requires a change to an active monitoring operation (step 1114). If so, then the monitoring service notifies the monitoring application to modify the manner in which the monitoring operation is being performed (step 1116), e.g., by sending a new set of operational parameters for the monitoring operation to the monitoring application that is handling the monitoring operation. In FIG. 11, after checking for the events that are shown, the process concludes, although depending upon the implementation of the process, the monitoring service may check for other events and/or repeat the process.

The advantages of the present invention should be apparent to one having ordinary skill in the art with reference to the detailed description of the present invention that has been provided hereinabove. Rather than require system administrators to know the complexities of the abilities and requirements of multiple monitoring applications, the present invention virtualizes monitoring applications by providing a virtualization layer of abstract logical or non-application-specific monitoring operations that represent implemented or application-specific monitoring operations at one or more supported monitoring applications. The present invention allows a new monitoring application to be introduced into a data center environment by defining logical monitoring operations that facilitate the execution of the implemented monitoring operations of the new monitoring application. In this manner, the details of a monitoring application and its deployment characteristics are not exposed to the computational entities that use the monitoring application. Moreover, the virtualization layer of the present invention helps to reduce the complexity of managing multiple monitoring applications. It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include storage media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer-implemented method for monitoring computational resources within a data processing system, the method comprising:
   receiving at a monitoring service a non-application-specific request to perform a monitoring operation to gather information about usage of a computational resource within a data processing system;
   automatically selecting, by the monitoring service from a set of monitoring applications each capable of performing the monitoring operation on the computational resource, a monitoring application based on at least one policy providing rules for selecting from amongst the set of monitoring applications each capable of performing the monitoring operation on the computational resource, wherein the non-application specific request is a generic request that is not executable by the selected monitoring application;

mapping, using the at least one policy, the non-application-specific request to an application-specific request that contains a different form of request than what is contained in the non-application-specific request; and sending, by the monitoring service to the selected monitoring application, the application-specific request, wherein the application-specific request sent to the selected monitoring application identifies the computational resource and indicates the monitoring operation to be performed on the computational resource.

2. The method of claim 1 further comprising:
determining a resource type of the computational resource;
retrieving configuration information for the set of monitoring applications; and
examining the configuration information for monitoring applications capable of monitoring the resource type of the computational resource.

3. The method of claim 2 further comprising:
examining the configuration information for monitoring applications capable of gathering information about metrics able to be monitored in accordance with the monitoring operation.

4. The method of claim 1 further comprising:
retrieving, by the monitoring service, a set of configuration profiles indicating one or more operational parameters for a monitoring operation on a given resource type, wherein each configuration profile of the set of configuration profiles contains information about capabilities of a particular monitoring application to perform certain types of monitoring operations with respect to certain types of computational resources;
selecting, by the monitoring service, a configuration profile from the retrieved set of configuration profiles based on the resource type of the computational resource; and
inserting, by the monitoring service, one or more operational parameters from the selected configuration profile into the application-specific request before sending the application-specific request to the selected monitoring application.

5. The method of claim 4 further comprising:
automatically notifying the selected monitoring application to modify the monitoring operation upon detection of a modification in the configuration policy.

6. The method of claim 1 further comprising:
receiving, by the monitoring service from the selected monitoring application, monitored data generated while performing the monitoring operation by the selected monitoring application on the computational resource.

7. The method of claim 6 further comprising:
sending, by the monitoring service to a requesting application, the received monitored data generated by the monitoring application.

8. The method of claim 1 further comprising:
automatically initiating the monitoring operation on the computational resource after the computational resource has been provisioned from a set of unprovisioned resources.

9. The method of claim 8 further comprising:
automatically terminating the monitoring operation on the computational resource upon automatic detection of predetermined events.

10. A computer program product stored on a computer-readable storage medium for use in a data processing system for monitoring computational resources within the data processing system, the computer program product comprising:

means for receiving at a monitoring service a non-application-specific request to perform a monitoring operation to gather information about usage of a computational resource within a data processing system;

means for automatically selecting, by the monitoring service from a set of monitoring applications each capable of performing the monitoring operation on the computational resource, a monitoring application capable of performing the monitoring operation on the computational resource based on at least one policy providing rules for selecting from amongst the set of monitoring applications each capable of performing the monitoring operation on the computational resource, wherein the non-application specific request is a generic request that is not executable by the selected monitoring application;

means for mapping, using the at least one policy, the non-application-specific request to an application-specific request that contains a different form of request than what is contained in the non-application-specific request; and means for sending, by the monitoring service to the selected monitoring application, the application-specific request, wherein the application-specific request identifies the computational resource and indicates the monitoring operation to be performed on the computational resource.

11. The computer program product of claim 10 further comprising:
means for determining a resource type of the computational resource;
means for retrieving configuration information for the set of monitoring applications; and
means for examining the configuration information for monitoring applications capable of monitoring the resource type of the computational resource.

12. The computer program product of claim 11 further comprising:
means for examining the configuration information for monitoring applications capable of gathering information about metrics able to be monitored in accordance with the monitoring operation.

13. The computer program product of claim 10 further comprising:
means for retrieving a set of configuration profiles indicating one or more operational parameters for a monitoring operation on a given resource type, wherein each configuration profile of the set of configuration profiles contains information about capabilities of a particular monitoring application to perform certain types of monitoring operations with respect to certain types of computational resources;
means for selecting a configuration profile from the retrieved set of configuration profiles based on the resource type of the computational resource; and
means for inserting one or more operational parameters from the selected configuration profile into the application-specific request before sending the application-specific request to the selected monitoring application.

14. The computer program product of claim 13 further comprising:
means for automatically notifying the selected monitoring application to modify the monitoring operation upon detection of a modification in the configuration policy.

15. The computer program product of claim 10 further comprising:

means for receiving, by the monitoring service from the selected monitoring application, monitored data generated while performing the monitoring operation by the selected monitoring application on the computational resource.

16. The computer program product of claim 15 further comprising:

means for sending, by the monitoring service to a requesting application, the received monitored data generated by the monitoring application.

17. The computer program product of claim 10 further comprising:

means for automatically initiating the monitoring operation on the computational resource after the computational resource has been provisioned from a set of unprovisioned resources.

18. The computer program product of claim 17 further comprising:

means for automatically terminating the monitoring operation on the computational resource upon automatic detection of predetermined events.

19. An apparatus for monitoring computational resources within a data processing system, the apparatus comprising:

a data processor and a memory operatively coupled to the data processor;

instructions to receive at a monitoring service within the data processing system a non-application-specific request to perform a monitoring operation to gather information about usage of a computational resource within the data processing system;

instructions to automatically select, by the monitoring service from a set of monitoring applications each capable of performing the monitoring operation on the computational resource, a monitoring application capable of performing the monitoring operation on the computational resource based on at least one policy providing rules for selecting from amongst the set of monitoring applications each capable of performing the monitoring operation on the computational resource, wherein the non-application specific request is a generic request that is not executable by the selected monitoring application;

instructions to map, using the at least one policy, the non-application-specific request to an application-specific request that contains a different form of request than what is contained in the non-application-specific request; and instructions to send, by the monitoring service to the selected monitoring application, the application-specific request, wherein the application-specific request identifies the computational resource and indicates the monitoring operation to be performed on the computational resource.

20. The apparatus of claim 19 further comprising:

instructions to determine a resource type of the computational resource;

instructions to retrieve configuration information for the set of monitoring applications; and instructions to examine the configuration information for monitoring applications capable of monitoring the resource type of the computational resource.

* * * * *